(12) United States Patent
Zhou

(10) Patent No.: US 6,859,491 B1
(45) Date of Patent: Feb. 22, 2005

(54) ITERATIVE ESTIMATION OF TIMING IN GSM BURSTS

(75) Inventor: Hai Zhou, Grange Park (GB)

(73) Assignee: Agere Systems INC, Allentown, PA (US)

(*) Notice: Subject to any disclaimer, the term of this patent is extended or adjusted under 35 U.S.C. 154(b) by 0 days.

(21) Appl. No.: 09/418,462

(22) Filed: Oct. 15, 1999

(30) Foreign Application Priority Data

Oct. 19, 1998 (EP) .............................................. 98308521

(51) Int. Cl.⁷ ............................................... H03H 7/30
(52) U.S. Cl. ...................... 375/231; 375/233; 375/343; 370/335; 370/337
(58) Field of Search ................................ 375/231, 233, 375/343, 285, 341, 348, 355, 366, 368; 370/335, 337, 509, 511

(56) References Cited

U.S. PATENT DOCUMENTS

| | | | | |
|---|---|---|---|---|
| 5,199,047 A | * | 3/1993 | Koch | 375/231 |
| 5,838,672 A | * | 11/1998 | Ranta | 370/335 |
| 5,946,350 A | * | 8/1999 | Uesugi | 375/233 |
| 6,144,709 A | * | 11/2000 | Piirainen et al. | 375/343 |

FOREIGN PATENT DOCUMENTS

| | | | |
|---|---|---|---|
| EP | 0 650 304 A2 | 10/1994 | H04Q/7/20 |
| WO | WO 94/18752 | 8/1994 | H03D/1/00 |
| WO | WO 97/44916 | 11/1997 | H04B/7/005 |

OTHER PUBLICATIONS

European Search Report, dated Apr. 12, 1999.

* cited by examiner

*Primary Examiner*—Shuwang Liu

(57) ABSTRACT

A method and apparatus for estimating the timing position of data bursts received in a data stream, where each data burst includes a number of bits comprising a training sequence in a fixed location. The receiver includes circuitry for, in respect of each received data burst, estimating at least one position of the timing location of the training sequence, equalizing the data burst for each estimated position, and correlating each equalized data burst. Where a plurality of positions of the timing location of the training sequence are estimated, the receiver circuitry, for each received data burst, determines the correlation result having the highest value and retains the equalized data burst associated with the correlation result having the highest value.

10 Claims, 5 Drawing Sheets

ITERATIVE ESTIMATION OF TIMING IN GSM BURSTS

CROSS-REFERENCE TO RELATED APPLICATION

This application claims priority of European Patent Application No. 98308521.8, which was filed on Oct. 19, 1998.

FIELD OF THE INVENTION

The present invention relates to the tracking of a training sequence in a transmitted radio signal, and particularly but not exclusively to the tracking of training sequences in data bursts in GSM systems. The invention is particularly advantageous when applied in highly noisy environments in which there is a low signal-to-noise ratio.

BACKGROUND TO THE INVENTION

In any radio communications system intersymbol interference (ISI) is caused in the radio path by reflections from objects far away from the receive antenna. The symbols become spread out in time and adjacent symbols interfere with each other. The receiver of the radio communications system must then determine the information that was intended to be sent.

In a GSM system, data is transmitted in bursts, which are placed within timeslots. A training sequence of a known pattern and with good autocorrelation properties is placed in the middle of the data burst. The training sequence is placed in the middle of the burst in order to provide correct channel estimation for the first and the second half of the burst. The position of the received burst in time varies from burst to burst, due to changes in the propagation channel and movement of the mobile station.

In a GSM system a channel equaliser is provided in the receiver. The purpose of the equaliser, placed in the path of the received signal, is to reduce the ISI and multi-path effects as much as possible to maximise the probability of correct decisions. The channel equaliser uses the training sequence in the burst to equalise the multi-path effects. In order to perform the equalization effectively, the receiver must first identify the exact position of the training sequence.

The training sequence is used by the equaliser to create a channel model, which changes all the time but which during one burst can be regarded as constant for a slowly varying channel in time. If two similar interfering signals arrive at the receiver at almost the same time, and if their training sequences are the same, there is no way to distinguish the contribution of each to the received signal. For this reason, different training sequences are allocated to channels using the same frequencies in cells that are close enough so that they do not interfere. When two training sequences differ, and are as little correlated as possible, the receiver can much more readily determine the contribution of each to the received signal.

The receiver knows the training sequence which the transmitter of the radio communications system transmits, and stores such training sequence. By correlating the stored training sequence with the training sequence received from the transmitter, the channel impulse response of the received signal can be measured. The equaliser creates a model of the transmission channel and calculates the most probable receiver sequence.

Conceptually, the equaliser takes the different time-dispersed components, weighs them according to the channel characteristics, and sums them after inserting the appropriate delay between components, so that a replica of the transmitted signal is restored.

The problem in cellular radio becomes more complex due to the dynamic nature of the channel. As the mobile moves through multipath surroundings, the equaliser must continually adapt to the changed channel characteristics. The equaliser knows the transmitted training sequence, and also knows what it has actually received. Thus, the equaliser can make an estimate of the channel transfer function. Thus an adaptive equaliser continuously updates the transfer function estimate, making sure that the decision error does not increase too much during the channel transmission.

In conventional systems, timing estimation is obtained by correlating a data burst with a training sequence stored in the base station. The base station knows the training sequence used by the mobile station. Correlations are performed at various bit positions of the received signal. The bit position that provides the highest correlation value is determined to be the first bit of the training sequence. The received data burst can then be effectively equalized to compensate for the channel.

However, this known technique suffers significantly from the effects of multipath delays in very noisy environments in which there is a low signal-to-noise ratio. Performing the correlation before the equalization leads to errors in timing estimation, and hence bit errors at the output of the equaliser.

It is therefore an object of the present invention to provide an improved technique for estimating the timing position of received data bursts, which operates reliably even in noisy environments.

SUMMARY OF THE INVENTION

According to the present invention, in one aspect there is provided a method of estimating the timing position of data bursts received in a data stream, each data burst including a number of bits comprising a training sequence in a fixed location, the method comprising the steps, for each received data burst, of: estimating at least one position of the timing location of the training sequence; equalizing the data burst for each estimated position; and correlating each equalized data burst.

There is thus provided a technique for estimating the timing position of data bursts which offers significant performance improvements in noisy environments.

Where a plurality of positions of the timing location of the training sequence are estimated, the method preferably further comprises the steps of, for each received data burst: determining the correlation result having the highest value; and retaining the equalized data burst associated with the correlation result having the highest value.

In a further aspect the invention provides a receiver for synchronizing data bursts received in a data stream, each data burst including a number of bits comprising a training sequence in a fixed location, the receiver including circuitry for, in respect of each received data burst, estimating at least one position of the timing location of the training sequence, equalizing the data burst for each estimated position, and correlating each equalized data burst.

Where a plurality of positions of the timing location of the training sequence are estimated, the receiver circuitry preferably, for each received data burst, determining the correlation result having the highest value and retaining the equalized data burst associated with the correlation result having the highest value.

DESCRIPTION OF PREFERRED EMBODIMENT

Figure 1A:
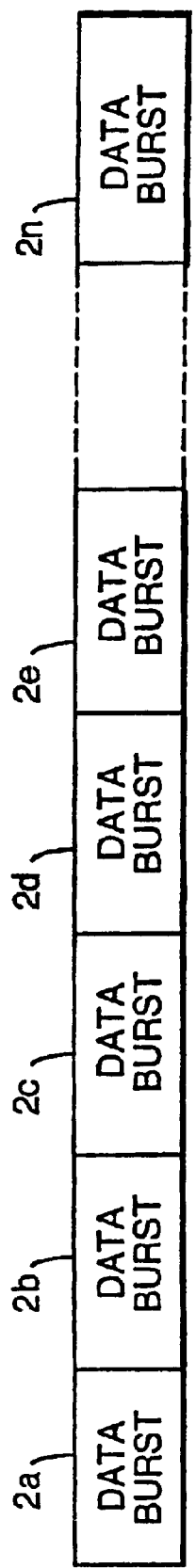
FIG. 1(a) shows the structure of a data stream of a GSM system comprising a number of data bursts.

Referring to FIG. 1(a) there is shown an overview of the basic structure of a typical GSM transmitted signal. As can be seen, the transmitted signal comprises a plurality of data bursts 2a to 2n. There are five different kinds of bursts in a GSM system: normal burst, synchronization burst, frequency correction burst, access burst, and dummy burst. Each burst is 156.25 bits long. The present invention applies to any burst containing a training sequence for equalizing the burst. The length of the training sequence varies according to the type of data burst. In a normal data burst the training sequence is 26 bits long.

In practice, transmitted messages are preceded by access bursts during the set-up phase of a transmission. The receiving station therefore initially seeks a training sequence of an access burst. Thereafter, the message includes a plurality of normal data bursts, and the receiving station seeks a training sequence of a normal data burst. The extraction of bursts from a transmitted message will be well understood by one skilled in the art and is outside the scope of the present invention.

Figure 1B:
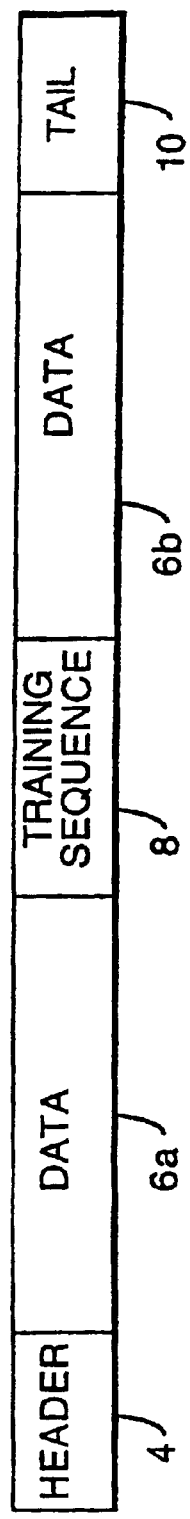
FIG. 1(b) shows the structure of a GSM normal data burst.

Referring to FIG. 1(b), it can be seen that each normal data burst comprises a header portion 4, a first data portion 6a, a training sequence 8, a second data portion 6b, and a tail portion 10. The format and generation of each portion of the data burst of FIG. 1(a) will be well known to those skilled in the art.

Figure 2:
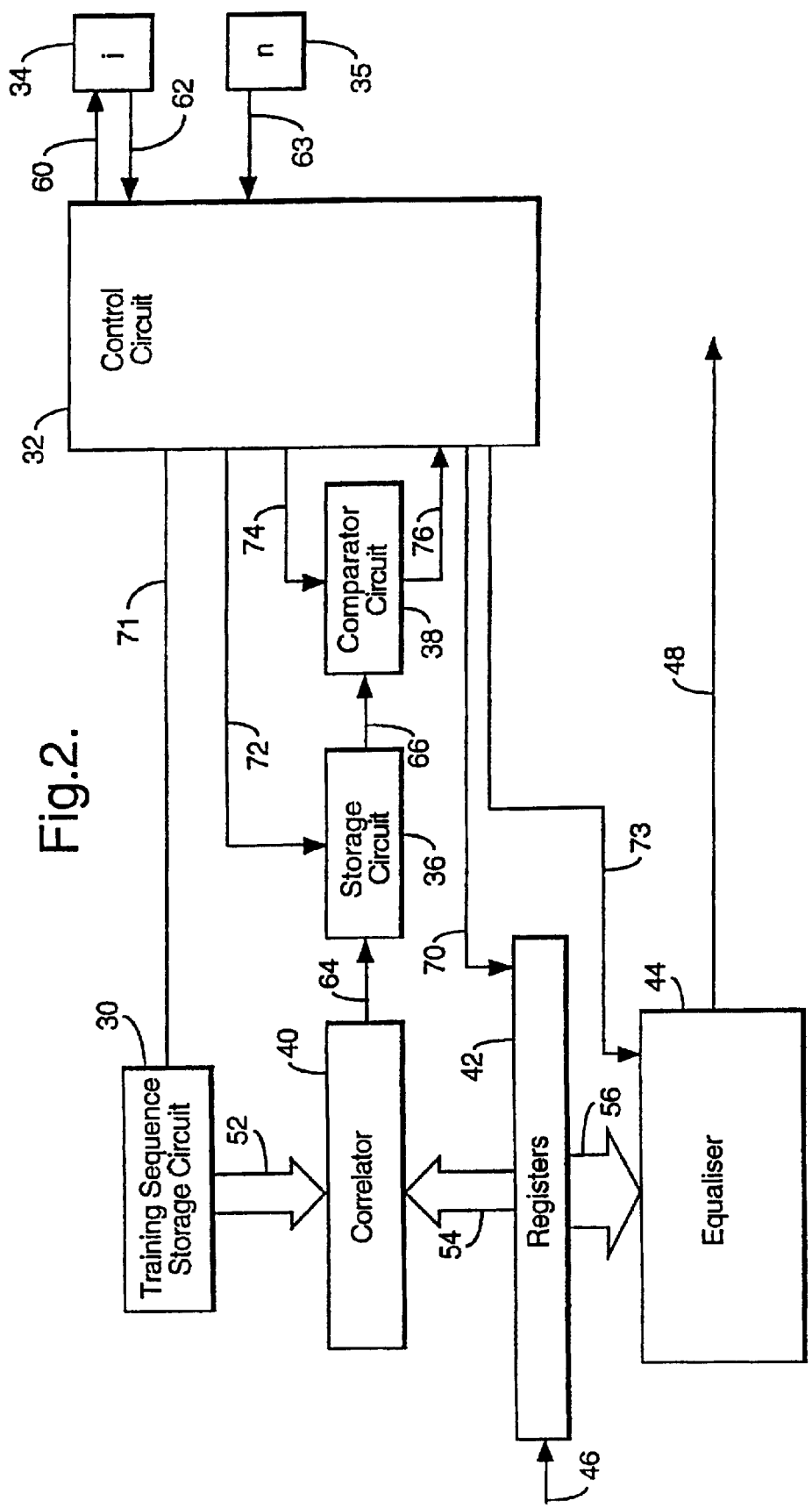
FIG. 2 is a block diagram illustrating the main components of a conventional circuit for performing equalization of a GSM data burst.

Referring to FIG. 2, there is shown a block schematic of equalization circuitry for performing the conventional equalization process in the receiver of a GSM mobile and GSM Base Station.

The equalization circuitry receives a data stream including data bursts as illustrated in FIG. 1 on a signal line 46 from the receive antenna. The equalization circuitry outputs the equalized data stream to be further processed in the receiver on a signal line 48.

The receive antenna, and the pre-processing circuitry (such as down-converter) which the received signal must go through prior to equalization is not shown in FIG. 2. Such circuitry is beyond the scope of the present invention and the implementation thereof will be within the capabilities of one skilled in the art.

The equalization circuitry includes a control circuit 32, a training sequence storage circuit 30, a correlator 40, a set of registers 42, an equaliser 44, a storage circuit 36, a comparator circuit 38, a counter 34, and a value store 35.

The operation of the circuitry of FIG. 2 will now be described in conjunction with the flow diagram of FIG. 3, which illustrates the steps performed in a conventional equalization process.

The equalization circuit receives the stream of data on signal line 46, and the received stream of data is shifted into the set of registers 42 under the control of a signal line 70 from the control circuit 32. The set of registers 42 are capable of storing a number of bits in excess of the number of bits in a data burst.

Figure 3:
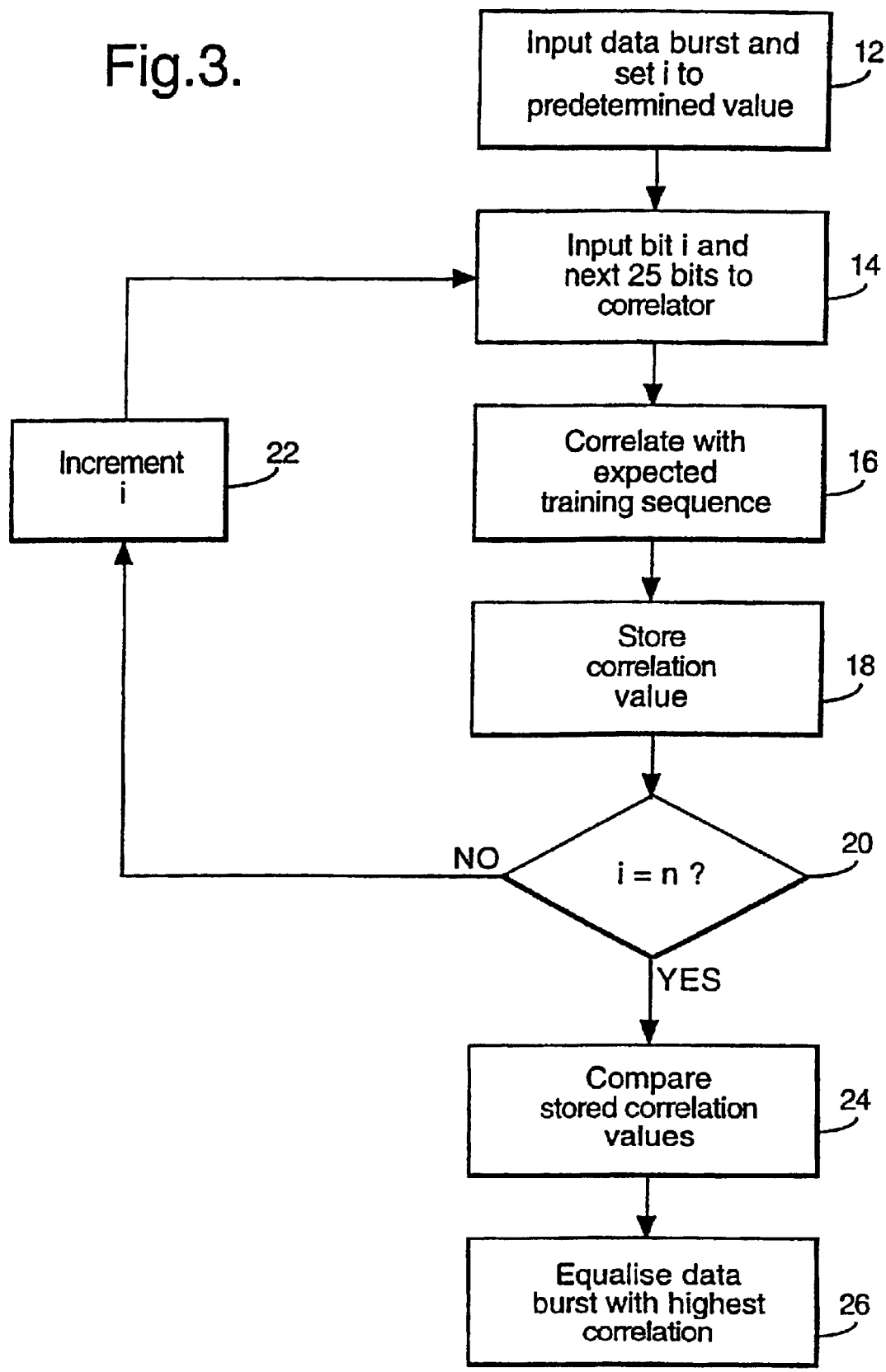
FIG. 3 is flow diagram illustrating the operation of the circuit of FIG. 2.

When the control circuit 32 has filled the set of registers 42 with the incoming data stream, in a step 12 of FIG. 3 the control circuit sets a signal on line 60 to set a value i in the counter 34. The value i in the counter is the bit position of the data stored in the set of registers 42 which it is estimated by the receiver is the first bit of the training sequence of the first data burst. This estimate of the bit position is predetermined.

In a next step 14, the receiver transfers the contents of the bit location i, and the next successive 25 bit locations of the received data stream (which comprise the 26 bits of the estimated training sequence in a GSM normal data burst), into the correlator 40 from the set of registers 42 via 26 bit parallel signal lines 54 under the control of the signals 70. The correlator also receives, on 26 bit parallel signal lines 52 the training sequence stored in the receiver in the training sequence storage circuit 30, which is the training sequence which the receiver expects to receive.

The correlator 40 then correlates, in a step 16, the estimated training sequence on parallel lines 54 with the stored training sequence on parallel lines 50. The receiver will therefore correlate the bit i and the next successive 25 bits of the received signal with the 26 bits of the training sequence storage circuit 30.

The result of this correlation is output on line 64, and in a step 18 the result is stored in the storage circuit 36 under the control of the signal 72 from the control circuit.

The control circuit 32 of the receiver then determines, in a step 20, whether the value i in the counter 34 is equal to a value n stored in the value store 35 and read on line 63. The value n is the maximum value of i for which the correlation is to be performed. The control circuit 32 reads the contents of the counter 34 on line 62 and compares it to the stored value n on line 63.

If the control circuit 32 determines that the value i has not yet reached the value n, then the receiver moves onto step 22 and increases the value i in the counter 32 by setting the signal on line 60 as illustrated by step 22 in FIG. 3. The amount by which the value i is incremented will be predetermined.

The steps 14 to 20 of FIG. 3 hereinbefore described are then repeated, but with a different value of i such that a different estimate of the training sequence is output on line 54 and correlated with the contents of the training sequence storage circuit.

When the value i equals the value n in step 20 of FIG. 3, the control circuit 32 of the receiver controls the comparator circuit 38 via line 74 to compare the stored correlation values in the storage circuit 36. The stored correlation values are presented to the comparator circuit 38 on lines 66 under the control of control circuit 32 via line 72. This is illustrated by step 24 in FIG. 3. The comparator circuit compares the stored correlation results and determines the highest value.

The storage circuit 36 stores the correlation results together with the value i for which the correlation was performed. The comparator outputs the value i of the highest correlation result to the control circuit 32 on line 76. The correlation result that returns the highest value is estimated to be the value of i that is the first bit of the training sequence of the first data burst.

In a step 26 the control circuit 32 outputs the set of bits forming the first data burst from the set of registers associated with a training sequence having a first bit in the bit position i. This data burst is output on the lines 56 to the equaliser 44.

For instance, in the example described of a GSM normal data burst, the data burst is 156.25 bits long, and the first bit of the training sequence is the $62^{nd}$ bit of the normal data burst. The control circuit therefore can determine the first bit of the data burst once it knows the location of the first bit of the training sequence, and can select all the bits of the data burst. If, say, 200 bits have been stored in the set of registers 42, the control circuit selects the 156.25 bits of the normal data burst.

Responsive to a control signal on line 73 from the control circuit 32, the equaliser 44 then equalises the received data burst. The data burst is equalized by the equaliser in a known manner in accordance with standard techniques to compensate for the propagation path of the channel. The equalized received data burst is then output on line 48 from the equaliser 44.

The equalization process removes the multi-path effects from the received signal. That is, the equalization process eliminates noise from the received signal and produces a clean version of it. The equaliser 44 is a matched filter.

The control circuit then shifts the first bit received in the set of registers 42 after the last bit of the first normal data burst to the most significant bit position of the set of registers, and then shifts in a further set of received bits into the set of registers until they are full. The above-described steps are then repeated to identify the training sequence of the second and further data bursts.

In the foregoing description the correlation was described as being performed on 26 bits selected from the received data on the basis that the example described was a normal data burst having a 26 bit training sequence. It will be appreciated that the control circuit 32 will be controlled by a processor in the receiver such that, if the incoming data burst is identified as a different type of burst having a different number of bits in the training sequence, the number of bits correlated will be altered and the training sequence stored in the training sequence storage circuit adjusted.

The conventional correlation and equalization technique described hereinabove with reference to FIGS. 2 and 3 may be applied in any receiver, whether the receiver is in a mobile station or a base station.

The operation of the improved equalization technique according to the present invention will now be described with reference to FIGS. 4 and 5.

Figure 4:
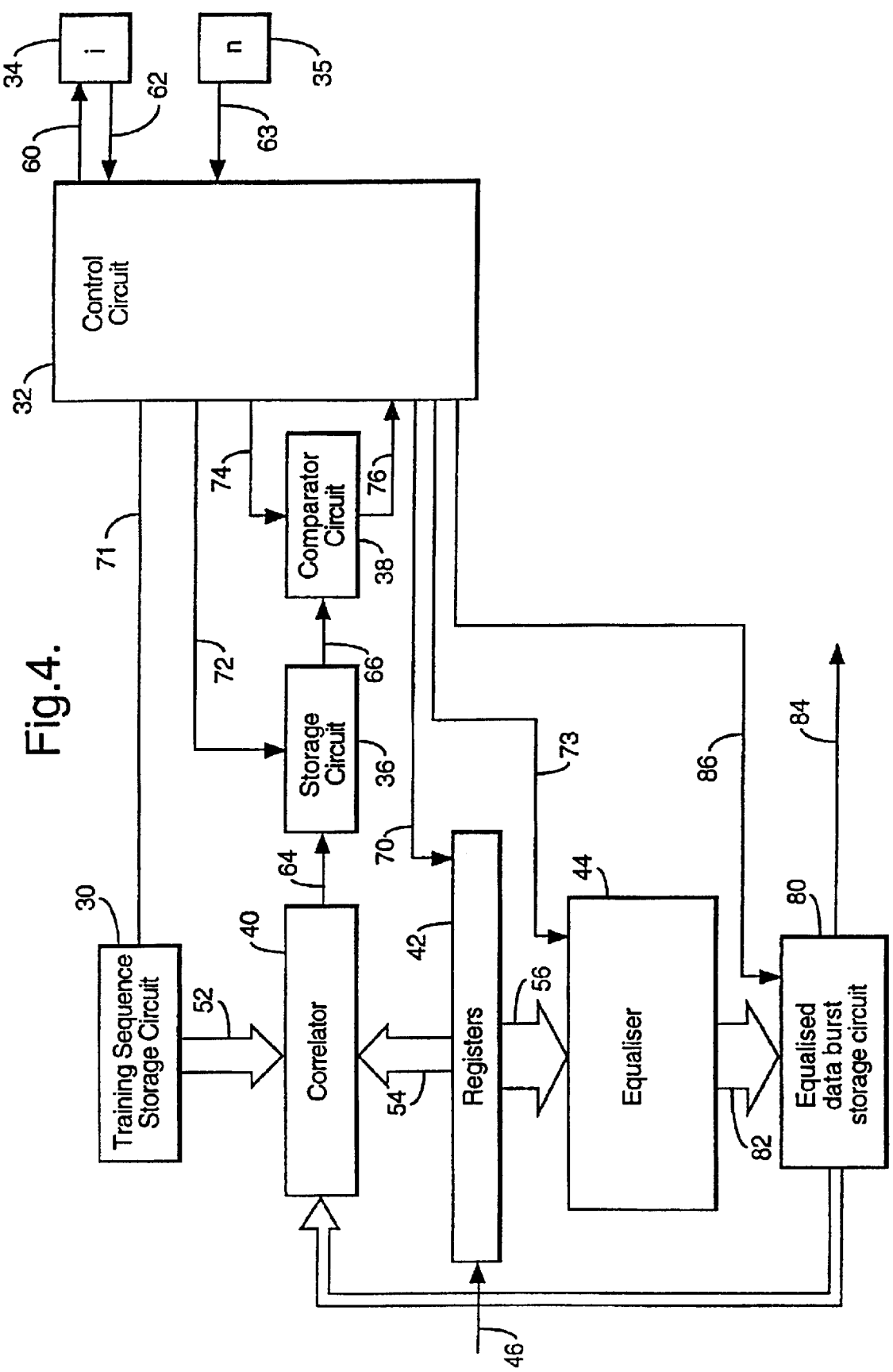
FIG. 4 is a block diagram illustrating the main components of a circuit for performing the equalization of a GSM data burst according to the present invention.

Referring to FIG. 4, there is shown a block schematic of circuitry for performing the equalization process in the receiver of a GSM mobile or GSM Base Station according to the present invention. Like reference numerals are used in FIG. 4 to illustrate elements which correspond to elements shown in FIG. 2. The equalization circuit of FIG. 4 additionally includes an equalized data burst storage circuit 80.

The receiver receives the data stream including data bursts as before on line 46, and outputs the equalized data bursts on line 84.

In an initial step 102 the control circuit inputs the data stream into the set of registers 42. When the data is loaded into the set of registers 42, the control circuit sets the contents i of the counter 34 via line 60, as before, to the first estimated bit position of the training sequence.

In a next step 106, the control circuit 32 outputs the data burst corresponding to the first bit of the training sequence being the bit i on parallel lines 56 to the equaliser. As before, in a step 108 the equaliser equalises the data burst based on a channel model presented by we a channel model circuit on lines 73.

According to the invention, the equaliser outputs the equalized data burst on parallel signal lines 82 to the equalized data burst storage circuit, where the equalized data burst is stored under the control of a signal 86 from the control circuit together with the value i of the counter 34.

In a step 110, the control circuit 32 then reads the contents of the counter 34 on line 62 and compares it to the stored value n in value store 35 on line 63. If the value i is not equal to the value n then the control circuit increments the value i in the counter 34 by a predetermined amount in step 112. In steps 106 and 108 the control circuit 32 repeats the equalization step for a different value of i and stores the equalized data burst and the corresponding value of i in the equalized data bursts storage circuit 80.

Thus the data stream loaded into the set of registers is equalized for a number of different values of i, i being an estimate of the first bit of the training sequence from which the first bit of the data burst is estimated.

When, in step 110, the value i equals the value n, the control circuit 32 resets the counter 34 to the original value of i and begins a second phase of operation, as illustrated by step 114.

In a step 116 the control circuit 32 controls the equalized data burst storage circuit 80 to output the estimated training sequences of the first equalized data burst on lines 78. Thus the equalized training sequence associated with the first predetermined value of bit i is output on lines 78 to the correlator 40. As before, the correlator also receives the stored training sequence on parallel lines 52 from the training sequence store 30.

In a step 118 the correlator correlates the two signals on lines 78 and 52 and generates a correlation value on line 64. Under the control of signal 72 from the control circuit 32, in step 120 the correlation value is stored in the storage circuit 36.

Thus the equalized training sequence associated with the first estimated position of the training sequence is correlated, and the value of the correlation stored together with the bit I associated with that estimated position.

In a next step 122 the control circuit 32 compares the value in the counter 34 on line 62 with the stored value n in value store 35. If i does not equal n then the control circuit sets the signal on line 60 to once again increment the value of i by a predetermined amount (being the same predetermined amount as in step 112) and then the step 116 to 120 are repeated for a the next value of i, i.e. for a different estimate of the training sequence.

Thus the equalized training sequences are correlated for successive values of i.

Figure 5:
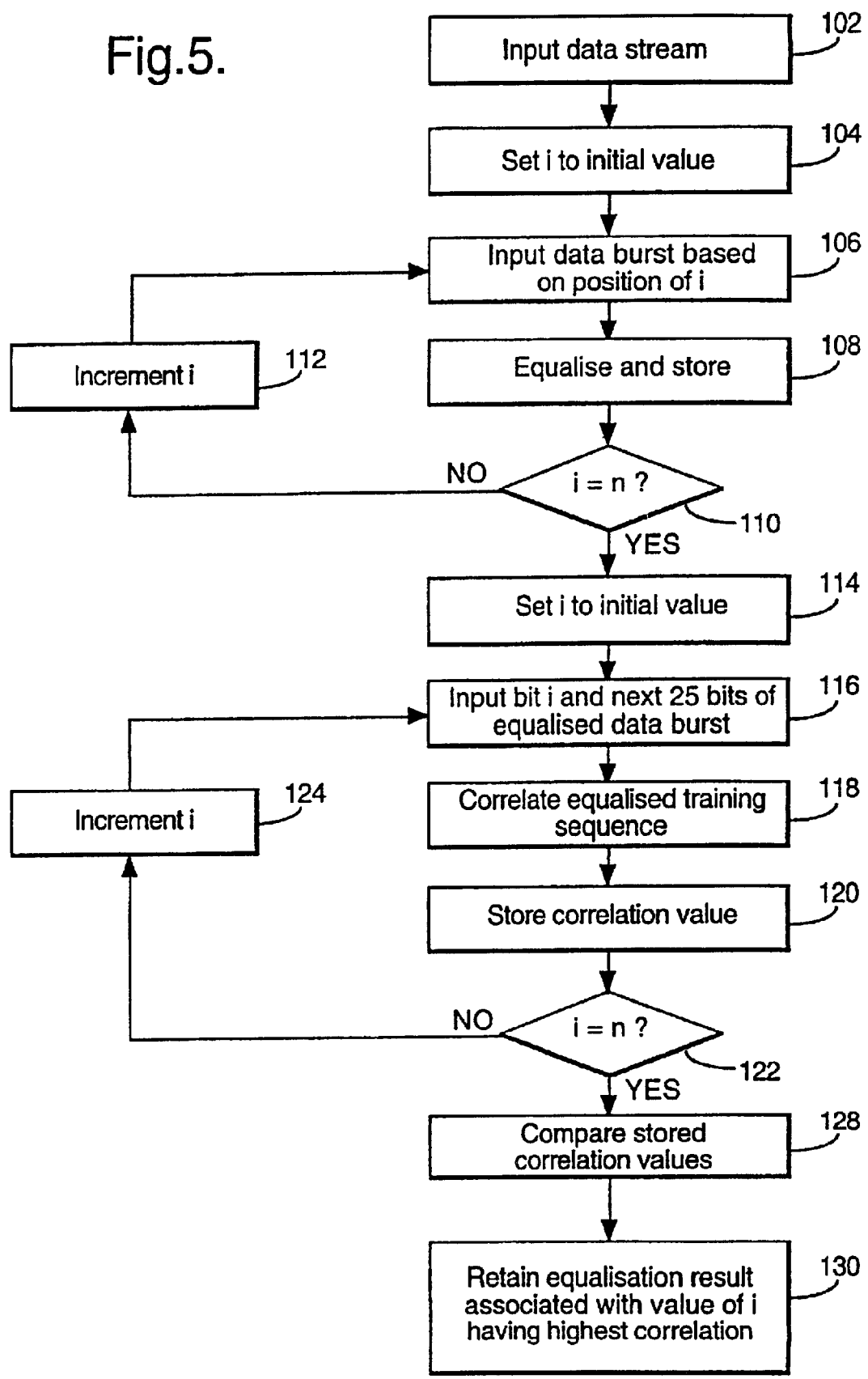
FIG. 5 is a flow diagram illustrating the operation of the circuit of FIG. 4.

When the value i equals the value n in step 122 of FIG. 5, the control circuit 32 of the receiver controls the comparator circuit 38 via line 74 to compare the stored correlation values in the storage circuit 36. The stored correlation values are presented to the comparator circuit 38 on lines 66 under the control of control circuit 32 via line 72. This is illustrated by step 128 in FIG. 5. The comparator circuit compares the stored correlation results and determines the highest value.

The storage circuit 36 stores the correlation results together with the value i for which the correlation was performed. The comparator outputs the value i of the highest correlation result to the control circuit 32 on line 76. The correlation result that returns the highest value is estimated to be the value of i that is the first bit of the training sequence of the first data burst.

In a step 130 the control circuit 32 sets the control signal on line 86 to the equalized data burst storage circuit 80 selecting the equalized data burst stored therein associated with the value i provided by the comparator circuit on line 76. The remaining equalized data bursts are discarded.

The steps described hereinabove are then repeated for the second and further data bursts.

The above described technique for timing estimation eliminates the effects of multipaths and provides large improvements over the conventional timing estimation techniques in terms of bit error rate at the output of the equaliser.

The invention has been described in relation to a specific example where multiple equalizations are performed prior to multiple correlations of the equalized data bursts. The essential component of the present invention is that the equalized data burst is correlated. Equalization removes the effects of multi-paths and interference and provides a clean version of the received data burst. According to the invention this clean data burst is then correlated. The invention thus applies to any environment where data bursts are normally correlated and then equalized. In noisy environments with low signal-to-noise ratios the present invention provides a particularly advantageous, much improved technique for estimating the timing position of received data bursts.

The technique is particularly effective in interference limited environments such as adaptive antennas processing, since the conventional timing estimation suffers not only from multipaths but also from interference from other cells. Adaptive antenna algorithms, such as space-time processing, remove the multipaths and interference.

The described technique requires a relatively large amount of processing power. The accuracy of timing estimation can always be traded with processing power available. Because of constraints on processing and power resources, it is likely that the technique of the present invention will currently be applied only in communication system base stations. Employing the present invention in current mobile stations would require additional processing capabilities, which are not currently available. However it is envisaged that future mobile stations will be able to support the present invention when the required processing and power capabilities are incorporated in mobile stations.

What is claimed is:

1. A method of estimating the timing position of data bursts received in a data stream, each data burst including a number of bits comprising a training sequence in a fixed location, the method comprising the steps, for each received data burst, of:

estimating a plurality of positions of the timing location of bits of the training sequence, and thereafter:

equalizing, in a first step, the data burst for all estimated positions; and correlating, in a second step, a training sequence portion of each equalized data burst with a known sequence.

2. The method of claim 1 in which a plurality of positions of the timing location of the training sequence are estimated, the method further comprising the steps of, for each received data burst:

determining, after said correlation step and for all estimated positions, the correlation result having the highest value; and retaining the one data burst associated with the correlation result having the highest value.

3. A receiver for synchronizing data bursts received in a data stream, each data burst including a number of bits comprising a training sequence in a fixed location, the receiver including circuitry for, in respect of each received data burst, estimating at least one position of the timing location of bits of the training sequence by equalizing the data burst for all estimated positions, and thereafter correlating a training sequence portion of all equalized data bursts with a known sequence.

4. The receiver of claim 3 in which a plurality of positions of the timing location of the training sequence are estimated, the receiver circuitry, for each received data burst, determining, after said correlation step for all estimated positions, the correlation result having the highest value and retaining the one equalized data burst associated with the correlation result having the highest value.

5. The method of estimating the timing position of data bursts received in a data stream in accordance with claim 1 in a mobile communication system.

6. The method of claim 5 wherein the mobile communication system is a GSM system.

7. A mobile communication system including the receiver according to claim 3.

8. A mobile station of a mobile communication system including the receiver according to claim 3.

9. A base transceiver station of a mobile communication system including the receiver according to claim 3.

10. A mobile communication system comprising a receiver for synchronizing data bursts received in a data stream, each data burst including a number of bits comprising a training sequence in a fixed location, the receiver including circuitry for, in respect of each received data burst, estimating at least one position of the timing location of bits of the training sequence by equalizing the data burst for all estimated positions, and thereafter correlating a training sequence portion of all equalized data bursts with a known sequence.

* * * * *